US011145138B2

(12) United States Patent
Grant et al.

(10) Patent No.: US 11,145,138 B2
(45) Date of Patent: Oct. 12, 2021

(54) VIRTUAL REALITY PRESENTATION OF LAYERS OF CLOTHING ON AVATARS

(71) Applicant: Linden Research, Inc., San Francisco, CA (US)

(72) Inventors: Jeremiah Arthur Grant, Petaluma, CA (US); Avery Lauren Orman, Cambridge, MA (US); David Parks, Pflugerville, TX (US); Richard Benjamin Trent Nelson, Concord, CA (US)

(73) Assignee: Linden Research, Inc., San Francisco, CA (US)

( * ) Notice: Subject to any disclaimer, the term of this patent is extended or adjusted under 35 U.S.C. 154(b) by 0 days.

(21) Appl. No.: 15/582,273

(22) Filed: Apr. 28, 2017

(65) Prior Publication Data
US 2018/0315254 A1 Nov. 1, 2018

(51) Int. Cl.
*G06T 19/20* (2011.01)
*G06T 13/40* (2011.01)
*G06T 15/04* (2011.01)
*G06T 3/40* (2006.01)
*G06T 17/20* (2006.01)

(52) U.S. Cl.
CPC ............. *G06T 19/20* (2013.01); *G06T 3/403* (2013.01); *G06T 13/40* (2013.01); *G06T 15/04* (2013.01); *G06T 17/20* (2013.01); *G06T 2200/24* (2013.01); *G06T 2207/20212* (2013.01); *G06T 2210/16* (2013.01); *G06T 2219/2004* (2013.01)

(58) Field of Classification Search
CPC ......... G06T 19/20; G06T 3/403; G06T 13/40; G06T 15/04; G06T 17/20; G06T 2200/24; G06T 2210/16
USPC .................................................. 345/423, 419
See application file for complete search history.

(56) References Cited

U.S. PATENT DOCUMENTS 7,663,648 B1 * 2/2010 Saldanha ................ G06T 17/00
345/630
2001/0026272 A1 10/2001 Feld et al.
(Continued)

OTHER PUBLICATIONS

Tomas Barak, "Kingdom Come: Deliverance—Character Clothing", Presented in GDC Europe, 2015.
(Continued)

*Primary Examiner* — Grace Q Li
(74) *Attorney, Agent, or Firm* — Greenberg Traurig

(57) ABSTRACT

A computing system and method to generate an avatar wearing multiple layers of clothing. For each clothing model acquired for the avatar, the system generates a customized clothing model based on transforming the original clothing model for fitting on the avatar based on deforming and physical simulation and a reduced clothing model based on collapsing the customized clothing model on the body of the avatar such that applying the reduced clothing model is simplified as painting the texture of the reduced clothing model onto the avatar model. Wearing the inner layers of the clothing by avatar is computed by applying the texture of the corresponding reduced clothing model on the body of the avatar in a sequence from inside layers to outside layers. The customized clothing model of the outermost layer is combined with the avatar wearing the inner layers to generate the avatar wearing the multiple layers of clothing.

15 Claims, 6 Drawing Sheets

(56) References Cited

U.S. PATENT DOCUMENTS

| | | | |
|---|---|---|---|
| 2002/0021297 A1* | 2/2002 | Weaver | A41H 3/007 |
| | | | 345/420 |
| 2007/0247465 A1 | 10/2007 | Hadap | |
| 2007/0273711 A1* | 11/2007 | Maffei | G06T 13/40 |
| | | | 345/630 |
| 2009/0138377 A1 | 5/2009 | Oh et al. | |
| 2011/0273456 A1 | 11/2011 | Coutinho et al. | |
| 2011/0298897 A1 | 12/2011 | Sareen et al. | |
| 2011/0310086 A1* | 12/2011 | Massen | G06T 17/00 |
| | | | 345/419 |
| 2012/0086783 A1* | 4/2012 | Sareen | G06N 3/006 |
| | | | 348/47 |
| 2012/0218262 A1* | 8/2012 | Yomdin | G06T 13/40 |
| | | | 345/419 |
| 2012/0309520 A1 | 12/2012 | Evertt et al. | |
| 2013/0057544 A1* | 3/2013 | Oh | G06Q 30/06 |
| | | | 345/419 |
| 2013/0249908 A1 | 9/2013 | Black et al. | |
| 2014/0022238 A1 | 1/2014 | Oh | |
| 2014/0168217 A1* | 6/2014 | Kim | G06T 13/40 |
| | | | 345/420 |
| 2014/0176565 A1* | 6/2014 | Adeyoola | G06T 19/006 |
| | | | 345/473 |
| 2014/0225888 A1* | 8/2014 | Bell | G06T 17/00 |
| | | | 345/419 |
| 2015/0134494 A1* | 5/2015 | Su | G06T 19/20 |
| | | | 705/27.2 |
| 2015/0269759 A1 | 9/2015 | Sekine et al. | |
| 2015/0317813 A1 | 11/2015 | Vendrow | |
| 2016/0088284 A1* | 3/2016 | Sareen | G06N 3/006 |
| | | | 348/47 |
| 2016/0092956 A1* | 3/2016 | Su | G06Q 30/0643 |
| | | | 705/26.5 |
| 2016/0180433 A1* | 6/2016 | Adeyoola | G06T 19/006 |
| | | | 705/26.62 |
| 2016/0219265 A1* | 7/2016 | Adeyoola | G06T 19/006 |
| 2016/0292779 A1* | 10/2016 | Rose | G06Q 30/0643 |
| 2016/0370971 A1 | 12/2016 | Hackett et al. | |
| 2016/0379419 A1 | 12/2016 | Khalili et al. | |
| 2017/0161948 A1 | 6/2017 | Hua et al. | |
| 2017/0278272 A1* | 9/2017 | Ravindra | G06T 7/62 |
| 2017/0323476 A1* | 11/2017 | Black | G06T 17/00 |
| 2018/0315253 A1 | 11/2018 | Grant et al. | |

OTHER PUBLICATIONS

"Create Ultra-Believable Cloth Simulation", web page at https://www.havok.com/cloth/ on Mar. 15, 2017.

"Havok Cloth—Style & Realism Demands Havok Cloth", Copyright 2015 Havok.

* cited by examiner

VIRTUAL REALITY PRESENTATION OF LAYERS OF CLOTHING ON AVATARS

FIELD OF THE TECHNOLOGY

At least some technologies disclosed herein relate to computer graphics processing and visual display in general and more specifically but not limited to three-dimensional modeling in a virtual world.

BACKGROUND

Computer technologies have developed for the presentation of three-dimensional virtual worlds to users of computing devices.

For example, a virtual world can be hosted on a set of server computers (e.g., secondlife.com). Client programs or viewers can be installed on user computers for connections to the server computers and for user participation in the virtual world. Users of a virtual world can be presented as the residents of the virtual world in the form of avatars. The resident avatars can travel in the three-dimensional virtual world, explore the three-dimensional virtual world, meet other resident avatars for virtual social activities, and communicate with each other via voice, instant messaging, text chart, local chat, and/or group chat. The avatars may build, create, shop and trade virtual objects and services with each other in the three-dimensional virtual world.

Avatars of a virtual world may take various forms, such as human, animal, vegetable, etc. In a virtual world, users may customize various aspects of their avatars and may choose to resemble the users themselves in appearance as they are in the real world. A user may have multiple avatars, but use only one avatar at a time for participation in the virtual world.

In a virtual world, a user of a client program or viewer of the virtual world can use conventional input devices to control the activities of the avatar that represents the user in the virtual world, such as keyboards and pointer control device (e.g., mouse, touch pad, track ball, joystick, and touch screen). The view of the virtual world as currently being seen by the avatar at its current position and orientation can be presented on a display device, such as a computer monitor, a display of a notebook computer, and a touch screen of a mobile device.

A virtual world hosted on a computer system may have virtual items, such as virtual currency, virtual clothing, and virtual artifacts. A user may purchase or acquire virtual clothing for decoration of the avatar of the user.

U.S. Pat. App. Pub. No. 2014/0022238, entitled "System for Simulating User Clothing on an Avatar" discloses a clothing simulation tool to generate images of an avatar wearing a virtual clothing item that is selected by the user to simulate the user wearing the actual clothing item, the disclosure of which is hereby incorporated herein by reference.

Some software tools have been developed to provide realistic simulation of cloth, hair, foliage and other soft body objects. Havok Cloth offered by www.havok.com is an example of such tools.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
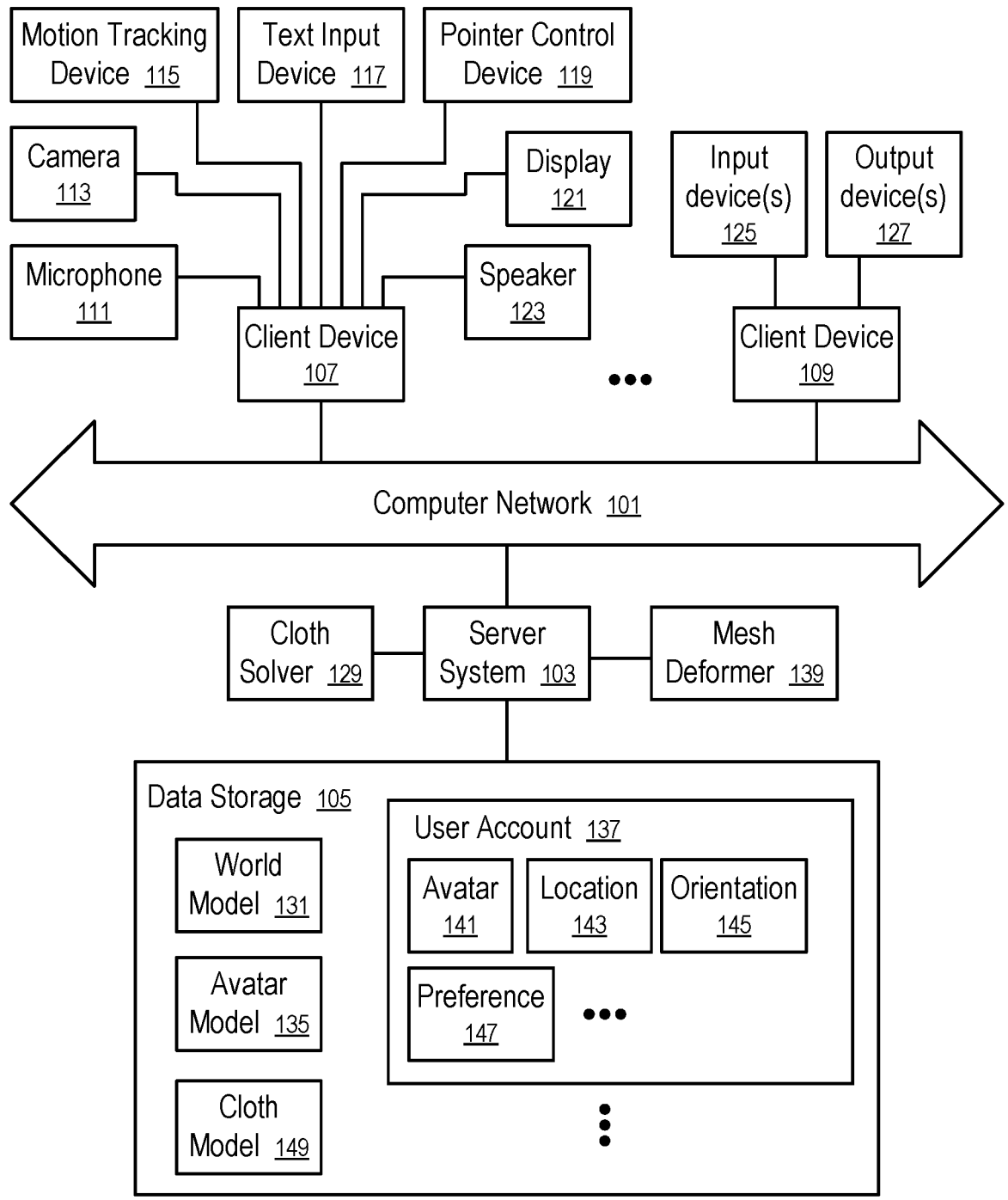
FIG. 1 shows a computer system in which techniques of the present disclosure can be used.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In a virtual world, different avatars may have various shapes and sizes. The size ratios of different body components of avatars may vary significantly. In some instances, a system may allow a user to customize an avatar by changing the shapes and ratios of the body components of one or more avatars of the user. As a result, a piece of virtual clothing optimized for one avatar may not fit well on another avatar.

The present disclosure provides techniques to transform a piece of virtual clothing for improved fitting on an avatar and/or allow efficient presentation of wearing multiple layers of virtual clothing on avatar.

For example, the shape of a piece of virtual clothing can be defined by a clothing mesh representing the surface(s) of the clothing; and a body mesh can be used to define the body surface of an avatar. Due to the dimensional differences between the clothing mesh and the body mesh, the virtual clothing may not fit outside the body surface of the avatar.

It is possible to stretch the clothing mesh to conform to the contour of the body surface of the avatar where the clothing is too small. However, the result of simply stretching the clothing wherever the clothing is too small relative to the avatar body is typically not appealing.

One technique of the present disclosure to improve the result includes the selectively stretching of the clothing in areas that need to follow along with the body, such as the ends of the sleeves, collar, and/or bottom of the virtual shirt. A mesh deformer is used to make those areas of the clothing mesh follow along with the body mesh. After the virtual clothing is selectively deformed according to the size, shape, characteristics of the avatar body, a cloth solver can be used to perform a physical simulation of the shrinking, expansion, draping, and/or folding of the pre-deformed clothing for fitting on the avatar. For example, an off-the-shelf cloth solver, such as Havok Cloth, can be used to perform the physical simulation. The physical simulation by the cloth solver determines the shape of the final clothing mesh as being worn on the body of the avatar.

Optionally, the system provides a user interface that allows the user customization of the deforming of selected areas of the clothing for fitting and/or the user customization of the physical simulation of the fitting of the pre-deformed piece of clothing on the avatar. Thus, the cloth solver computes the user preferred fitting of the clothing on the avatar.

For example, the user interface may allow the user to select areas for deforming, stretching, draping, folding, and/or shrinking. For example, the user may be provided with a brush tool to paint on mesh values of desired stiffness or looseness, for example, to control the transition of stretching, deforming, draping, folding, and/or shrinking.

In general, when multiple layers of clothing are applied on an avatar, the process of detecting potential penetration of one layer of clothing through another layer of clothing (e.g., via ray-casting) can be computationally intensive. The computational complexity increases when the number of layers increases. One technique of the present disclosure automatically shrinks the inner layer of clothing onto the body surface of the avatar, as if the layer of clothing is painted on the body surface of the avatar so that another layer of clothing can be fitted on the avatar based on the body shape of the avatar without the need to consider the potential penetration between the layers of clothing. Such an approach can generate appealing results with reduced computation burdens.

The combined the shape and appearance of the clothing mesh of the outermost layer of clothing, the inner layer(s) clothing painted on to the body of the avatar, and the visible shape of the body of the avatar forms a new model of the avatar with the multiple layers of clothing. The new model of the avatar wearing the multiple layers of clothing can be rendered for presentation in a three-dimensional world to other avatars.

A typical avatar in a three-dimensional virtual world has a position and orientation. A user device provides inputs to control the position and orientation of the avatar in the virtual world to simulate the experience of traveling in the virtual world by presenting the virtual world from the point of view of the position and orientation of the avatar. The virtual reality system (e.g., a server system and/or the client program/viewer) renders a view of the virtual world based on position and orientation of the avatar and presents the view of the virtual world on the user device. The view of the virtual world includes other avatars in the field of view of the avatar, and other virtual objects, such as virtual building, parks, theaters, streets, etc.

Within the view of the virtual world, the virtual reality system may identify a set of objects or avatars that may be of particular interest to the avatar. For examples, when an avatar speaks to a nearby listening avatar, the listening avatar may become a point of interest for the gaze of the speaking avatar. For examples, when an avatar listens to a nearby speaking avatar, the speaking avatar may become a point of interest for the gaze of the listening avatar. For examples, when an avatar speaks to a group of avatars, the avatars in the group may become potential points of interest for the gaze of the speaking avatar. A computer system hosting the virtual world renders a view of the virtual world from the point of the gaze of the avatar and the present the view to the user of the avatar, as if the user of the avatar is viewing the virtual world according to the gaze of the avatar.

FIG. 1 shows a computer system in which techniques of the present disclosure can be used.

In FIG. 1, a server system (103) has a data storage (105) storing a three dimensional world model (131) and avatar models (135). The virtual world represented by the model (131) may or may not resemble a part of the real world on the Earth. Client devices (107, . . . , 109) can be used to access the virtual world via the server system (103). For example, the server system (103) may generate a view of the virtual world and provide the view to a client device (109) for display. For example, the server system (103) may extract a portion of the world model (131) and the avatar model (135) relevant for the display of the view for the client device (109); and the client device (109) constructs a view of the portion of the virtual world from the data extracted and provided by the server system (103).

In FIG. 1, a user of the server system (103) has a user account (137) stored in the data storage (105). The user account (137) hosts information such as the identification of an avatar (141) of the user in the virtual world, the location (143) and orientation (145) of the avatar (141) in the virtual world, preferences (147) of the user, such as the personalization parameters of the avatar (141).

After a user of a client device (109) is authenticated for the authorization to access the virtual world via the user account (137), the input devices (125) of the client device (109) provide user inputs to control the location (143) and orientation (145) of the avatar (141) of the user; and the server system (103) provides a data stream to the client device (109) according to the location (143) and the orientation (145) of the avatar (141) such that the client device (109) presents, on the output device (127), the view of the virtual world that is perceived to be seen in the eyes of the avatar (141). The view of the virtual world simulates the experience of a user in the virtual world at the location (143) and orientation (145) of the avatar (141); and the display of the virtual world on the client device (109) corresponds to the presentation of a video stream captured by a virtual camera at a location (143) and orientation (145) of the avatar (141). Since the view is in the eyes of the avatar (141), the view generally does not include the avatar (141) itself and more specifically the eyes of the avatar (141). However, the avatar (141) itself and the eyes of the avatar (141) can be in the views of other avatars that are in the vicinity of the avatar (141).

Examples of the input devices (125) include a text input device (117) (such as a keyboard, a virtual keyboard implemented on a touch screen, text input implemented via speech recognition), a pointer control device (e.g., arrow keys of a keyboard, a mouse, a track ball, a touch pad, a touch screen, a joystick), a motion tracking device (e.g., motion sensors attached to a head-mount display, data glove, mobile phones, personal media player, mobile computing device, game controller), a digital camera (113), a microphone (111), etc.

Examples of the output devices (127) include a display (121) (e.g., a computer monitor, a touch screen, a head-mount display, a virtual reality headset) and a speaker (123) (or earphone, headphone In some instances, a client device (109) has an eye-tracking capability (e.g., via a head-mount camera (113) that capture video images of the eyes of the user, a front facing camera (113) of a smart phone, a tablet computer, a mobile device), which makes it possible to control the eye movements of an avatar (141) and/or the field of view of the avatar (141) independent of the movement of the location (143) and orientation (141) of the avatar (141) as a whole.

In some instances, when the client device (109) does not have an eye-tracking capability, the system is configured to present eye movements based on predictions, eye movement models, preferences (147), and other inputs from other devices (e.g., 117, 119). For example, predetermined patterns of eye movements are animated based on predetermined models. Thus, the experiences of the user of the avatar (141) can be improved, as well as the experiences of other users interacting with the avatar (141) of the user in the virtual world.

The system of FIG. 1 can also be used for the presentation of augmented reality, where virtual representations of users in the form of avatars are projected into a view of a real world. The avatars may have the form of a human and/or be generated based on images of the users of the avatars so that the avatars resemble the users in real world.

FIG. 1 illustrates the use of a centralized server system (103) to host the virtual world represented by the world model (131). In other implementations, the virtual world may be hosted on a distributed computer network.

In FIG. 1, the system includes a cloth model (149) of a piece of virtual clothing. The cloth model (149) defines the shape and appearance of a piece of virtual clothing. For example, the shape of the clothing can be defined by a clothing mesh in a three dimensional space; and the appearance can be defined by the texture of the elements of the clothing mesh. The cloth model (149) may be created by a system administrator or an end user and offered to other avatars.

In FIG. 1, the avatar model (135) defines the shape and appearance of the body of the avatar. For example, the shape of the avatar can be defined by a body mesh in a three dimensional space; and texture properties of the elements of the body mesh define the appearance of the body surface of the avatar.

When a piece of virtual clothing defined by the cloth model (149) is applied to the avatar model (135) to simulate the wearing of the clothing on the avatar (141) for the user account (137), the server system (103) generates the avatar (141) for the user account (137) that combines the cloth model (149) and the avatar model (135) and/or any applicable preferences (147).

To generate the avatar (141) wearing the clothing defined by the cloth model (149), the server system (101) scales the piece of clothing uniformly according to the overall size of the avatar. The scaled clothing mesh may fit the body mesh in some areas, but not other areas. For example, in certain edges, the clothing mesh may be too big for the corresponding body component of the avatar; in other edges, the clothing mesh may be too small. The server system (103) uses a mesh deformer (139) to stretch or shrink the edges for an improved fit (e.g., in areas such as sleeves, collar, and/or bottom). The stretching or shrinking of the selected edges can cause stretching or shrinking in the vicinity of the edges; and the degree of stretching or shrinking reduces to diminishing deformation from the edges to other parts of the clothing that are far away from the edges that are being stretched. In one implementation, the stretching or shrinking simulates the result of applying forces to stretch the selected areas/edges on the clothing made of an elastic material. The stiffness or elasticity of the material effects how far the stretching force propagates into other areas to cause deformation in other parts of the clothing. Preferably, the mesh deformer (139) of the server system (103) selectively deforms the clothing according to the size of the body mesh at a few strategic locations (e.g., corresponding to the location of the sleeves, collar, and/or bottom).

After the clothing is transformed by the mesh deformer (139), the server system (103) uses the cloth solver (129) to simulate the physical wearing of the deformed clothing on the body of the avatar (141). To fit the clothing on the avatar (141), the cloth solver (129) may further stretch portions of the clothing to fit the contour of certain portions of the body that are too big for the clothing pre-transformed by the mesh deformer. The cloth solver (129) computes the draping of the clothing in area where the contour of certain portions of the body may be too small to fully support the clothing. Optionally, the cloth solver (129) may shrink the clothing at such areas where the body of the avatar is too small. The simulation determines the combined shape of the clothing on the body of the avatar (141), which forms a new avatar model that wears the clothing.

Optionally, the server system (103) facilitates a user interface on the client devices (107, . . . , 109) to allow the user to interactively adjust the deforming of the cloth model and/or the fitting simulation on the cloth solver (129).

For example, the server system (103) may allow the user to select areas (e.g., sleeves, collar, and/or bottom) for stretching or shrinking by the mesh deformer (139), the degree of stretching or shrinking, and the stiffness/elasticity of the clothing for the propagation of the stretching or shrinking applied at the selected locations.

For example, the server system (103) may allow the user to select parameters for the fitting simulation by the cloth solver (129). The user may selectively identify areas for optional shrinking to remove excessive draping. For example, the user may specify the stiffness/elasticity of the clothing for the propagation of the stretching or shrinking applied by the cloth solver (129).

Figure 2:
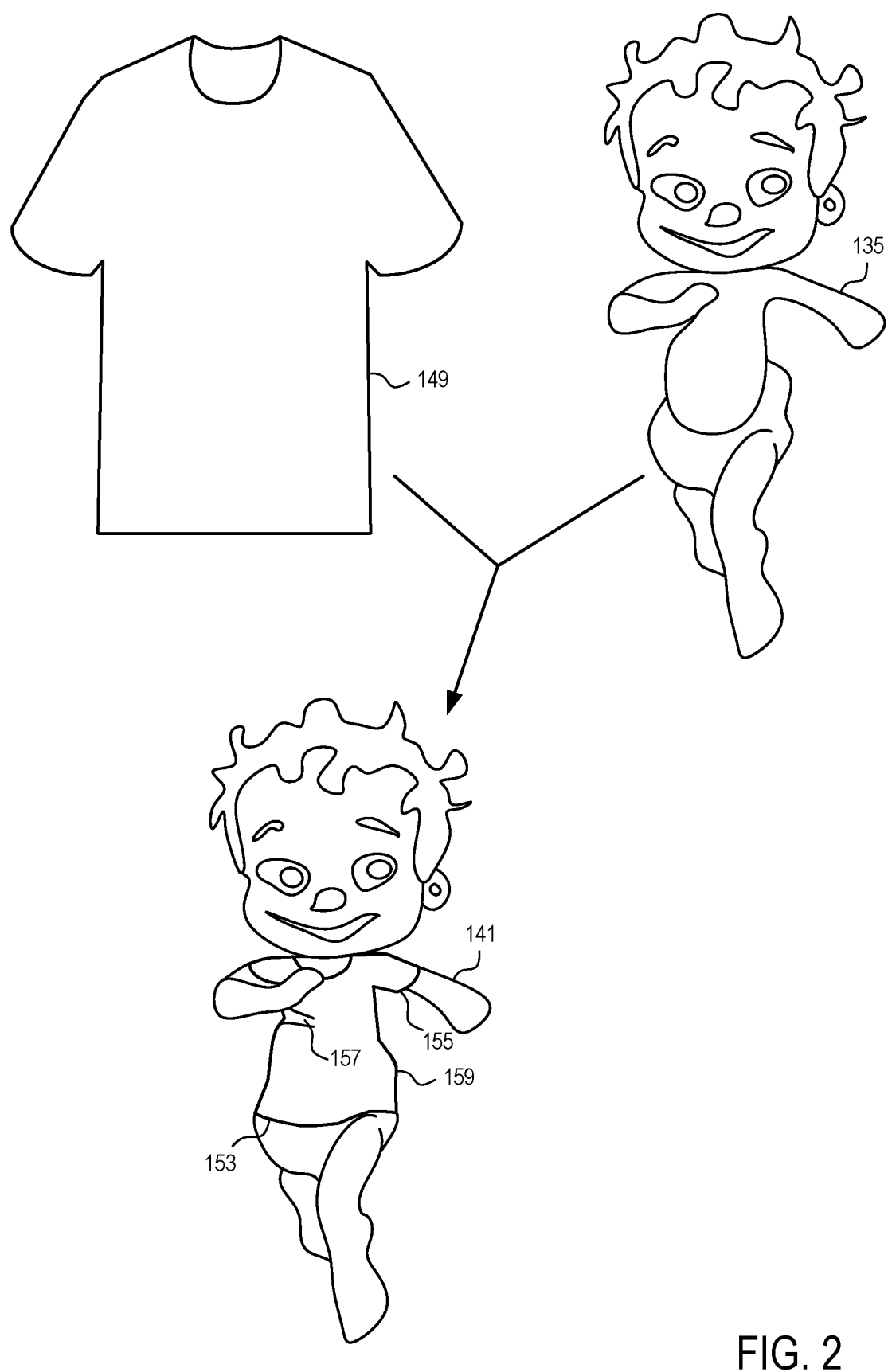
FIG. 2 shows the fitting of a piece of clothing on an avatar according to one embodiment.

FIG. 2 shows the fitting of a piece of clothing on an avatar according to one embodiment. For example, the fitting process of FIG. 2 can be implemented in the computer system illustrated in FIG. 1.

FIG. 2 illustrates a cloth model (149) and an avatar model (135). By combining the cloth model (149) and the avatar model (135) using the mesh deformer (139) and the cloth solver (129), the server system (103) generates an avatar (141) that wears the piece of clothing (159) according to the cloth model (149) and the avatar model (135).

In FIG. 2, the overall size of the cloth model (149) is uniformly scaled to fit the overall size of the avatar model (135). The mesh deformer (139) is used to deform the edge (153) prior to the cloth solver (129) simulating the wearing of the clothing defined by the scaled and deformed cloth model on the avatar model (135). The simulation generates the resulting avatar (141) that wears the clothing (159), including the feature of draping and/or folding in the certain areas (e.g., 155, 157) and stretching in other areas.

Figure 3:
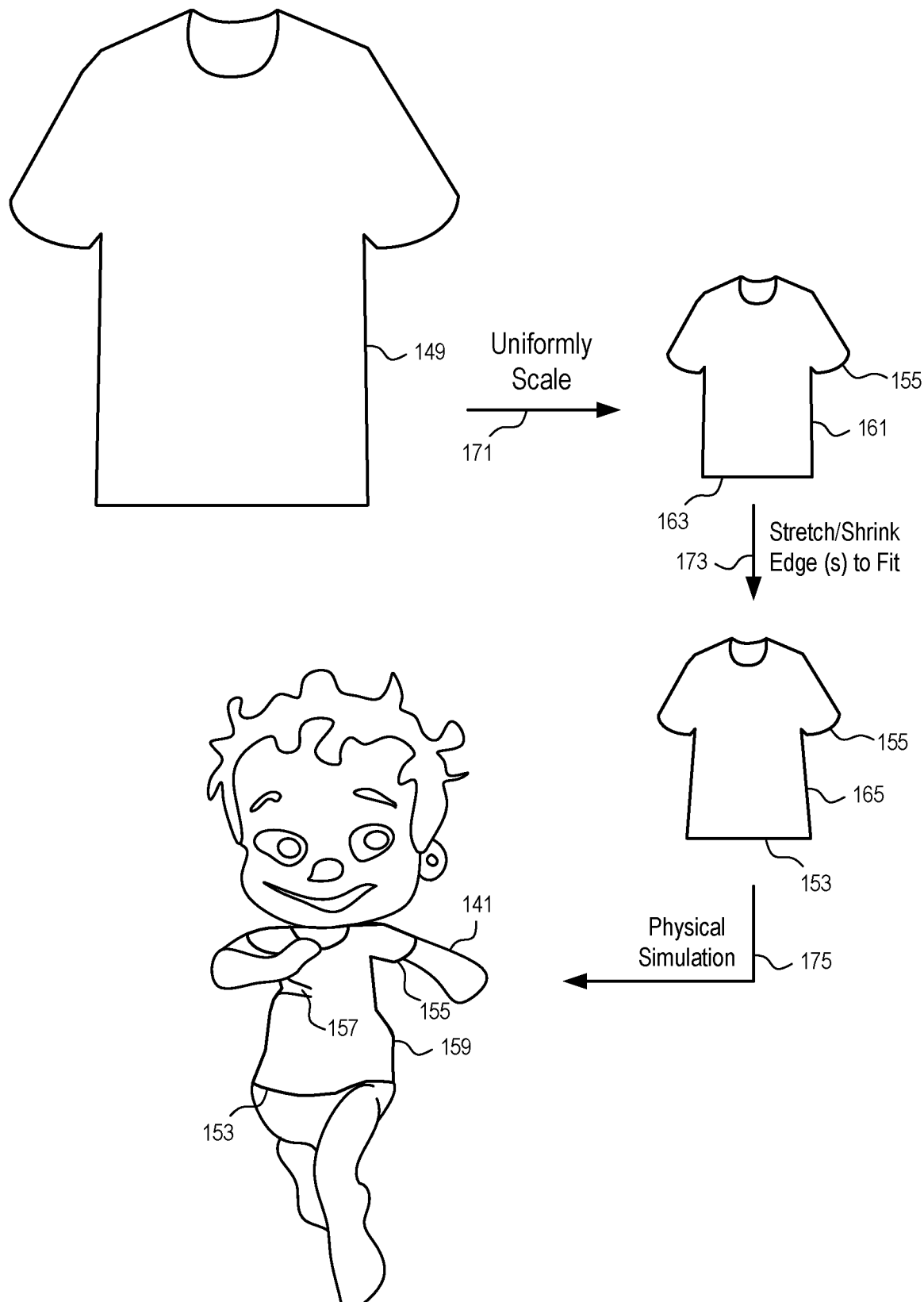
FIG. 3 illustrates a sequence of transformations to fit a piece of clothing on an avatar in a virtual world.

FIG. 3 illustrates a sequence of transformations to fit a piece of clothing on an avatar in a virtual world. For example, the sequence of transformation of FIG. 3 can be used to combine the cloth model (149) and the avatar model (135) to generate the avatar (141) that wears the piece of clothing (159) illustrated in FIG. 2.

In FIG. 3, the cloth model (149) is uniformly scaled (171), according to an overall size of the avatar model (135), to generate a scaled model (161). The overall size of the avatar model (135) can be automatically computed from the avatar model (135), or explicitly specified by the user of the user account (137).

Optionally, an interactive user interface is provided to enable the user to customize the scaling (171). The user interface that shows the scaled model (161) in view of the avatar model (135) (e.g., by presenting the scaled model (161) and the avatar model (135) side by side) so that the scaling (171) is performed according to a size identify by the user and is scaled to the satisfaction of the user.

The server system (103) compares sizes of edges of the clothing (e.g., 163 and 155) with the sizes of corresponding body components of the avatar model (135) to select edges for stretching or shrinking by the mesh deformer (139).

For example, when the edge (155) is too loose for fitting on the arm of the avatar model (135), the server system (103) may select the edge (155) for shrinking by the mesh deformer (139).

For example, when the edge (163) is too small for fitting on the torso of the avatar model (135), the server system (103) may select the edge (163) for stretching by the mesh deformer (139).

In the example of FIG. 2, the mesh deformer (139) stretches (173) the edge (163) of the scaled cloth model (161) to generate the deformed cloth model (165) that has an enlarged edge (153). The stretching transits gradually from the edge (163/153) to the other portions of the piece of clothing that are away from the edge (163/153).

In the example of FIG. 2, the edge (155) is not shrunk; and the cloth solver (129) computes the shape of draping of the clothing near the edge (155) during the physical simulation (175) of the deformed cloth model (165) on the avatar model (135) to generate the avatar (141) wearing the clothing (159).

In some instances, an interactive user interface is provided to allow the user to customize the stretching and/or shrinking performed by the mesh deformer (139). For example, the user interface allows the user to select an edge for stretching or shrinking and specify the desired size of the stretching or shrinking. For example, the user interface may allow the user to adjust the stiffness of the clothing mesh and/or the distribution of the stiffness of the clothing mesh to adjust the transition of the deformation from the selected edges (e.g., 163/153) into the interior areas of the clothing. The deformed model (165) and the avatar model (135) can be presented side by side in the user interface so that the user may visually inspect and determine when the deformed model (165) is of satisfaction to the user.

In some instances, an interactive user interface is also provided to allow the user to customize the physical simulation of the fitting of the deformed cloth model (165) on the avatar (141). The cloth solver (129) may stretch certain portions of the clothing for fitting on the avatar (141) and/or optionally shrinking certain portions of the clothing to reduce folding or draping resulted from loose areas (e.g., 155). In some instances, a user may optionally identify areas for expansion or shrinking; and the result of the fitting simulation can be presented for interactive adjustment. The cloth solver (129) may stretch or shrink the user selected portions according to the stiffness of the cloth mesh specified for the mesh deformer (139) and/or stiffness parameters specified by the user for the physical simulation (175) (e.g., using a paint tool that paints the stiffness values on the clothing in a way similar to colors being painted on the clothing).

Figure 4:
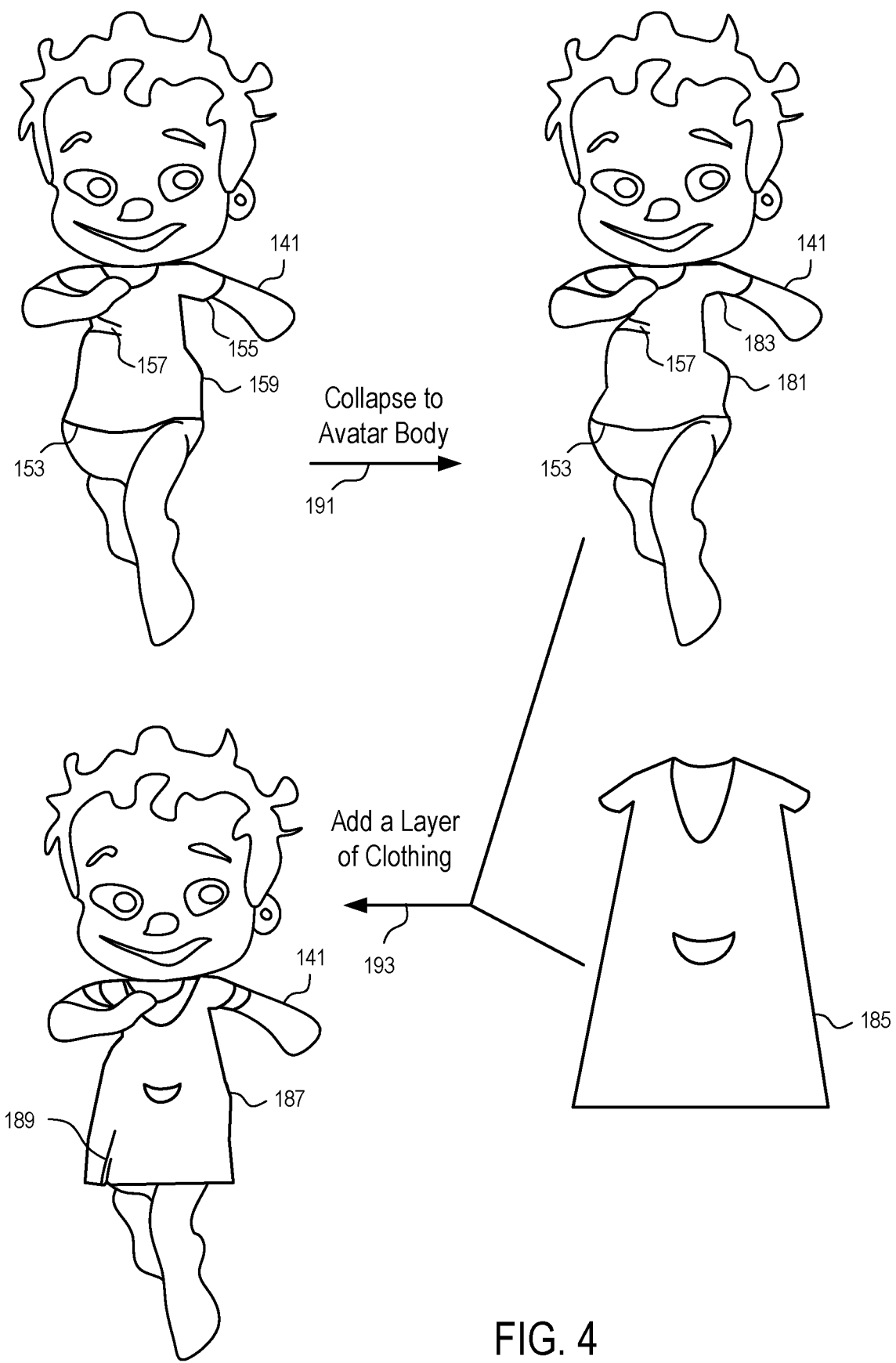
FIG. 4 illustrates a method to presenting the fitting of multiple layers of virtual clothing on an avatar.

FIG. 4 illustrates a method to presenting the fitting of multiple layers of virtual clothing on an avatar. For example, the method of FIG. 4 can be used in combination with the transformations of FIG. 3 for the determination of a fitted version of a piece of clothing. However, it is not necessary to use to the complete sequence of transformations of FIG. 3 to generate a fitted version of a piece of clothing. For example, a scaled version (161) can be directly simulated for wearing on the avatar (141) without the use of the mesh deformer (139) for the stretching (173) or shrinking at selected edges of the clothing.

In FIG. 4, after the physical simulation of fitting of the clothing (159) on the avatar (141) is computed, the server system (103) computes the collapsing (191) of the clothing (159) onto the avatar body (191) such that the collapsed clothing mesh (181) agrees with the body mesh of the avatar (141). As a result, showing the avatar (141) wearing the collapsed clothing (181) can be simplified as painting the texture of the clothing (181) on the corresponding body surface of the avatar (141).

After the avatar (141) wearing the collapsed clothing (181) is computed, the server system (103) computes the adding (193) of another lay of the clothing according to the cloth model (185) using the sequence of transformations as illustrated in FIG. 3 to generate the update avatar (141) wearing two layers of clothing. The outer layer (187) is generated based on the clothing model (185); and the inner layer (181) is generated based on a different clothing model (149). The simulation of the outer layer (181) may include the folding (e.g., 189), draping, stretching and/or shrinking of a deformed version of the model (185) for customized fitting on the avatar (141).

In one implementation, the server system (103) stores a clothing mesh (159) resulting from a physical simulation (175) and its collapsed version (181) for each piece of clothing acquired for the avatar (157). When the user specifies the wearing of multiple layers of clothing on the avatar, the server system (103) can rapidly compute the result by painting the textures of the collapsed version (e.g., 181) of the inner layers, according to the sequence of layers from inside to outside, onto the body surface of the avatar (141) and then apply the clothing mesh (159 or 187) resulting from the physical simulation (175) performed by the cloth solver (129) for the outer most layer to generate the resulting avatar model (141) that wears multiple layers of the clothing.

Figure 5:
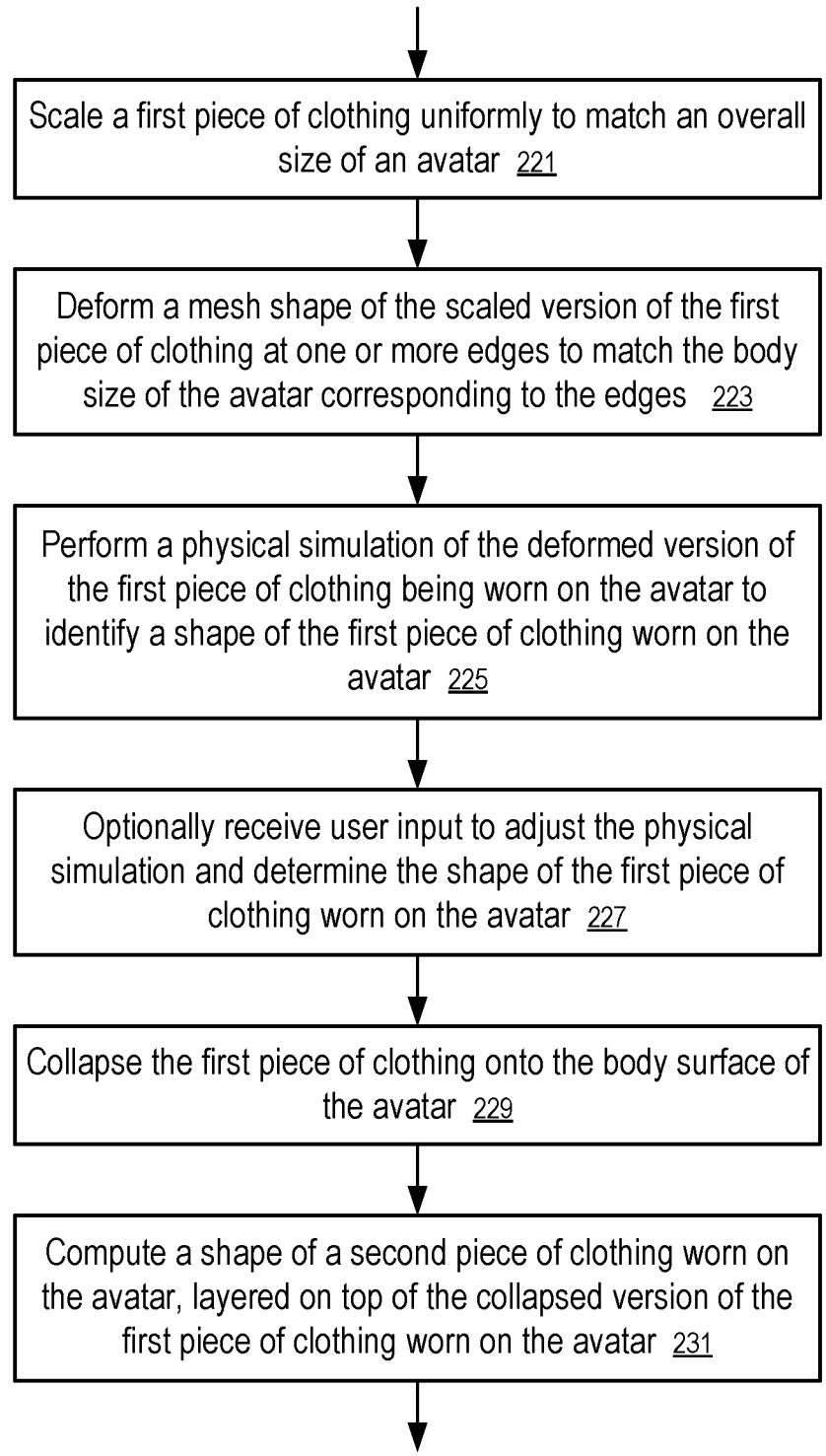
FIG. 5 shows a method to present clothing on an avatar.

FIG. 5 shows a method to present clothing on an avatar. For example, the method of FIG. 5 can be implemented in the computing system of FIG. 1 using the transformation and/or fitting techniques of FIGS. 2-4.

In FIG. 5, a server system (103) is configured to: scale (221) a first piece of clothing (149) uniformly to match an overall size of an avatar (135); deform (223) a mesh shape of the scaled version (161) of the first piece of clothing (149) at one or more edges (e.g., 163) to match the body size of the avatar (135) corresponding to the edges (e.g., 163); perform (225) a physical simulation of the deformed version (165) of the first piece of clothing (149) being worn on the avatar (135) to identify a shape (159) of the first piece of clothing (149) worn on the avatar (135); optionally (227) receive user input to adjust the physical simulation and determine the shape (159) of the first piece of clothing (149) worn on the avatar (135); collapse (229) the first piece of clothing (e.g., having the shape (159)) onto the body surface of the avatar (135) to generate a collapsed version (181) of the first piece of the clothing (149); and compute (231) a shape (187) of a second piece of clothing (185) on the avatar (135), layered on top of the collapsed version (181) of the first piece of clothing (149) worn on the avatar (135). The server system (103) may include the mesh deformer (139) and/or the cloth solver (129) in some instances. In other instances, the mesh deformer (139) and/or the cloth solver (129) are implemented on separate servers that provide services to the server system (103) over computer network connections.

A computing system to implement a three-dimensional virtual reality world may include: a server system (103); and a data storage device (105) storing: a three-dimensional model (131) of the virtual reality world; avatar models (e.g., 135) representing residences of the virtual reality world; and cloth models (e.g., 149) defining the shapes and appearances of clothing that may be worn by avatars in the virtual world.

For example, a method implemented in the three-dimensional virtual reality world to generate a presentation of an avatar wearing multiple layers of clothing includes generating, for each generic cloth model (e.g., 149) acquired for an avatar model (135), 1) a fitted cloth model (159) particularly transformed for the avatar model (135) and 2) a collapsed cloth model (181) for the avatar model (135). The generation of the fitted cloth model (159) and the corresponding collapsed cloth model (181), according to the generic cloth model (135), is performed independently from the generation of corresponding fitted and collapsed cloth models for other pieces of clothing (e.g., 185).

For example, the fitted cloth model (159) can be generated from: scaling (171) uniformly the generic cloth model (149) to match an overall size of the avatar model (135) to generate a scaled cloth model (161); after identifying at least one edge (e.g., 163) of the scaled cloth model (161) that needs deformation for improved fitting, deforming (e.g., stretching (173) or shrinking) the scaled cloth model (161) at the edge (e.g., 163) to change a size of the edge (e.g., 163) and generate a deformed cloth model (165); and performing a physical simulation (175) of fitting the deformed cloth model (165) on the avatar model (135) to compute the fitted cloth model (159) as worn on the avatar (141) identified by the avatar model (135).

For example, the collapsed cloth model (181) can be generated by shrinking/collapsing (191) the fitted cloth model (159) onto the body surface of the avatar (141) to have a perfect tight fit so that the collapsed cloth model (181) has the same shape of the portion of the body surface of the avatar (141) on which the clothing of the collapsed cloth model (181) will be worn. Thus, the result of wearing the clothing according to the collapsed cloth model (181) can be computed efficiently by applying the texture of the collapsed cloth model (181) onto the corresponding body surface of the avatar (141).

For example, to generate an avatar model having the avatar (141) wearing a piece of clothing according to a first cloth model (149) inside a piece of clothing according to the second clothing (185), the server system (103) applies the textures of the collapsed cloth model (181), generated according to the first cloth model (149), onto the avatar (141) to generate the avatar (141) wearing the inner layer of clothing according to the collapsed cloth model (181) and then combines the avatar (141) wearing the inner layer with the fitted cloth model (187), generated according to the second cloth model (185), to generate the avatar (141) wearing the outer layer of clothing (185) over the inner layer of clothing (149).

In general, the deforming of a scaled cloth model (161) to generate a deformed cloth model (165) may include stretching an edge (163) of the scaled first cloth model (161) to generate a corresponding expanded edge (153) of the deformed first cloth model (165) and/or shrinking an edge of the scaled first cloth model to generate a corresponding reduced edge of the deformed first cloth model.

Optionally, an interactive user interface is provided to receive user input to customize the deforming of the scaled cloth method (161), such as the identification of stiffness of at least a portion of the scaled first cloth model, the identification of an edge (163) for the deforming, and the identification of a degree of the deforming (e.g., the size of the corresponding expanded/reduced edge). The interactive user interface presents the deformed first cloth model in response to the user input and/or shows the deformed first cloth model (165) and the avatar model (135) side by side for visual inspection by the user of the avatar (141).

Optionally, an interactive user interface is provided to receive user input customizing the physical simulation (175). The physical simulation (175) computes the shape of draping (e.g., 157), folding (e.g., 189), stretching and shrinking of portions of the fitted cloth model (159) worn on the avatar (141).

Optionally, an interactive user interface is provided to present the scaling (171) in response to user input to customize the scaling (171).

Figure 6:
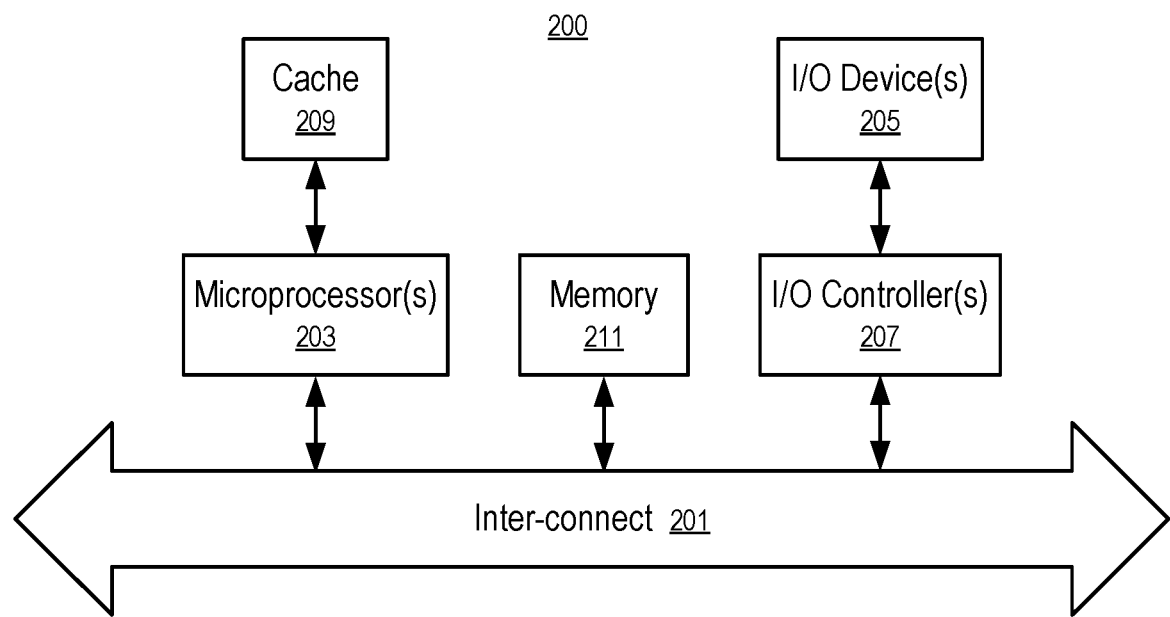
FIG. 6 shows a data processing system on which the methods of the present disclosure can be implemented.

Each of the client devices (107, . . . , 109), the server system (103), the cloth solver (129), and/or the mesh deformer (139) can be implemented in the form of one or more data processing systems illustrated in FIG. 6, with more or fewer components.

The present disclosure includes the methods discussed above, computing apparatuses configured to perform methods, and computer storage media storing instructions which when executed on the computing apparatuses causes the computing apparatuses to perform the methods.

FIG. 6 shows a data processing system on which the methods of the present disclosure can be implemented. While FIG. 6 illustrates various components of a computer system, it is not intended to represent any particular architecture or manner of interconnecting the components. Other systems that have fewer or more components than those shown in FIG. 6 can also be used.

In FIG. 6, the data processing system (200) includes an inter-connect (201) (e.g., bus and system core logic), which interconnects a microprocessor(s) (203) and memory (211). The microprocessor (203) is coupled to cache memory (209) in the example of FIG. 6.

In FIG. 6, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. When the data processing system is a server system, some of the I/O devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented in a three-dimensional virtual reality world, the method comprising:
   receiving a first cloth model and an avatar model;
   transforming the first cloth model into a fitted first cloth model worn on an avatar having a body defined by the avatar model;
      wherein the transforming of the first cloth model into the fitted first cloth model includes:
         scaling uniformly the first cloth model, before non-uniform stretching or shrinking of the first cloth model, to match an overall size of the avatar model to generate a uniformly scaled first cloth model;
         identifying at least one boundary edge of cloth represented by the uniformly scaled first cloth model that has a dimension mismatch between the cloth and the avatar represented by the avatar model;
         determining a dimension change of the boundary edge of cloth relative to the avatar to reduce the dimension mismatch between the cloth and the avatar;
         stretching or shrinking the boundary edge of the cloth according to the dimension change to cause non-uniform stretching or shrinking of the uniformly scaled first cloth model, resulted from reduction from the stretching or shrinking according to the dimension change at the boundary edge of the cloth to diminished stretching or shrinking in areas away from the boundary edge of cloth;
         generating a deformed first cloth model from the stretching or shrinking the boundary edge of the cloth according to the dimension change; and
         performing a physical simulation of fitting the deformed first cloth model on the avatar model to generate the fitted first cloth model worn on the avatar;
   receiving a second cloth model;
   transforming the second cloth model into a fitted second cloth model worn on the avatar independently of the first cloth model;
   collapsing the fitted first cloth model onto a body surface of the avatar to generate a collapsed cloth model;
   painting textures of the collapsed cloth model on the body surface of the avatar to generate the avatar wearing an inner layer of clothing according to the first cloth model; and
   combining the fitted second cloth model and the avatar wearing an inner layer of clothing to generate the avatar wearing an outer layer of clothing according to the second cloth model.

2. The method of claim 1, further comprising:
   receiving a user input to customize the reduction from the stretching or shrinking according to the dimension change at the boundary edge of the cloth to the diminished stretching or shrinking in areas away from the boundary edge of cloth.

3. The method of claim 2, wherein the user input includes identification of stiffness of at least a portion of the scaled first cloth model.

4. The method of claim 2, wherein the user input includes identification of the edge for the deforming.

5. The method of claim 2, wherein the user input includes identification of a degree of the dimension change.

6. The method of claim 2, further comprising:
   providing an interactive user interface to present the deformed first cloth model in response to the user input.

7. The method of claim 1, further comprising:
   providing a user interface to receive a user input customizing the physical simulation.

8. The method of claim 7, wherein the physical simulation includes computing of draping, folding, stretching and shrinking in portions of the fitted first cloth model worn on an avatar of the avatar model.

9. The method of claim 1, further comprising:
   providing an interactive user interface to present the scaling in response to a user input to customize the scaling.

10. A non-transitory computer storage medium storing instructions configured to instruct a computer device to perform a method implemented in a three-dimensional virtual reality world, the method comprising:
   storing, for each generic cloth model in a plurality of cloth models acquired for an avatar model independently of others of the plurality of cloth models:
      a respective fitted cloth model; and
      a respective collapsed cloth model; and
      wherein the fitted cloth model is generated from the generic cloth model by:
         scaling uniformly the generic cloth model along a plurality of dimensions to match an overall size of the avatar model to generate a uniformly scaled generic cloth model;
         identifying at least one boundary edge of cloth represented by the uniformly scaled generic cloth model that has a dimension mismatch between the cloth and an avatar represented by the avatar model;
         determining a dimension change of the boundary edge of cloth relative to the avatar to reduce the dimension mismatch between the cloth and the avatar;
         stretching or shrinking the boundary edge of the cloth according to the dimension change to cause non-uniform stretching or shrinking of the uniformly scaled generic cloth model, resulted from reduction from the stretching or shrinking according to the dimension change at the boundary edge of the cloth to diminished stretching or shrinking in areas away from the boundary edge of cloth;
         generating a deformed cloth model from the stretching or shrinking the boundary edge of the cloth according to the dimension change; and
         performing a physical simulation of fitting the deformed cloth model on the avatar model to generate the fitted cloth model worn on the avatar;
   in response to a user request to apply the plurality of cloth models on the avatar models according to a sequence of layers of clothing from inside to outside,
      painting textures of collapsed cloth models of inner layers of the plurality of cloth models on the avatar model according to the sequence to generate an avatar model wearing the inner layers; and
      combining a fitted cloth model generated from an outermost layer of the plurality of cloth models on the avatar model and the avatar model wearing the inner layers to generate an avatar model wearing the plurality of cloth models according to the sequence from inside to outside.

11. The medium of claim 10, wherein the collapsed cloth model has a clothing mesh having a shape same as a part of a body surface of the avatar defined by the avatar model.

12. The medium of claim 11, wherein the collapsed cloth model is generated by shrinking the fitted first cloth model onto the avatar model.

13. A computing system to implement a three-dimensional virtual reality world, the system comprising:
   a server system; and
   a data storage device storing:
      a three-dimensional model of the virtual reality world;
      avatar models representing residences of the virtual reality world; and
      cloth models defining shapes and appearances of clothing;
   wherein for each of a plurality of cloth models acquired by a user for an avatar model, the server system generates and stores:
      a respective fitted cloth model based on a physical simulation of fitting the respective fitted cloth model on the avatar model independently of others of the plurality of cloth models, wherein the fitted cloth model is generated by:
         scaling uniformly a generic cloth model along a plurality of dimensions to match an overall size of an avatar model to generate a uniformly scaled generic cloth model;
         identifying at least one boundary edge of cloth represented by the uniformly scaled generic cloth model that has a dimension mismatch between the cloth and an avatar represented by the avatar model;
         determining a dimension change of the boundary edge of cloth relative to the avatar to reduce the dimension mismatch between the uniformly scaled generic cloth model and the avatar;
         stretching or shrinking the boundary edge of the uniformly scaled generic cloth model according to the dimension change to cause non-uniform stretching or shrinking of the uniformly scaled generic cloth model, resulted from reduction from the stretching or shrinking according to the dimension change at the boundary edge of the uniformly scaled generic cloth model to diminished stretching or shrinking in areas away from the boundary edge of the uniformly scaled generic cloth model; and
         generating a deformed cloth model from the stretching or shrinking the boundary edge of the uniformly scaled generic cloth model according to the dimension change; and
      a respective collapsed cloth model having a shape that is the same as to a shape of at least a portion of the avatar on which the collapsed cloth model is to be worn; and
   wherein in response to a user request to apply the plurality of cloth models on the avatar models according to a sequence from inside to outside, the server system:
      paints textures of collapsed cloth models of inner layers of the plurality of cloth models on the avatar model according to the sequence to generate an avatar model wearing the inner layers; and
      combines a fitted cloth model generated from an outermost layer of the plurality of cloth models on the avatar model and the avatar model wearing the inner layers to generate an avatar model wearing the plurality of cloth models according to the sequence from inside to outside.

14. The computing system of claim 13, wherein the respective collapsed cloth model is generated by collapsing the respective fitted cloth model onto a body surface of the avatar model.

15. The computing system of claim 14, wherein the respective fitted cloth model is generated from the physical simulation of fitting the respective fitted cloth model on the avatar model.

* * * * *